(12) United States Patent
Chominski

(10) Patent No.: US 7,062,231 B2
(45) Date of Patent: Jun. 13, 2006

(54) DIRECT MODULATION TRANSMITTER UTILIZING SIGNALS SQUARING

(75) Inventor: Paul P. Chominski, San Diego, CA (US)

(73) Assignee: MediaTek Inc., Hsin-Chu (TW)

( * ) Notice: Subject to any disclaimer, the term of this patent is extended or adjusted under 35 U.S.C. 154(b) by 1013 days.

(21) Appl. No.: 09/943,714

(22) Filed: Aug. 30, 2001

(65) Prior Publication Data

US 2003/0045248 A1   Mar. 6, 2003

(51) Int. Cl.
*H04B 1/02* (2006.01)

(52) U.S. Cl. .................. 455/91; 455/118; 327/100; 327/113

(58) Field of Classification Search ............ 455/91, 455/118; 327/100, 113
See application file for complete search history.

(56) References Cited

U.S. PATENT DOCUMENTS

| | | | |
|---|---|---|---|
| 5,604,929 A * | 2/1997 | Loper et al. ............... 455/324 |
| 6,047,023 A * | 4/2000 | Arnstein ..................... 375/229 |
| 6,072,997 A * | 6/2000 | Kawai ......................... 455/214 |
| 6,298,096 B1 * | 10/2001 | Burgin ......................... 375/296 |
| 6,658,066 B1 * | 12/2003 | Magoon et al. ............. 375/298 |
| 6,738,601 B1 * | 5/2004 | Rofougaran et al. ....... 455/66.1 |
| 2002/0032570 A1* | 3/2002 | Kub et al. ................... 704/500 |
| 2002/0136288 A1* | 9/2002 | McCarty, Jr. ............... 375/232 |

FOREIGN PATENT DOCUMENTS

| SU | 1775867 A1 | 11/1990 |
|---|---|---|
| SU | 1788589 A1 | 2/1991 |

* cited by examiner

*Primary Examiner*—Fan Tsang
*Assistant Examiner*—Matthew Genack
(74) *Attorney, Agent, or Firm*—Andrew D. Fortney

(57) ABSTRACT

A apparatus to provide a direct modulation transmitter having high dynamic range and low distortion using signal processing at a first frequency level for a signal to be transmitted and increasing frequency to transmission frequency in a manner to avoid distortion and utilizing a squaring function in up-converting basic processing signal.

10 Claims, 1 Drawing Sheet

DIRECT MODULATION TRANSMITTER UTILIZING SIGNALS SQUARING

FIELD OF INVENTION

The present invention relates to direct modulating transmitters and more particularly to transmitters with minimized modulation distortion and dynamic range.

BACKGROUND OF THE INVENTION

Direct modulation transmitter architecture, in which no intermediate frequency stage is utilized is finding increased popularity. A significant application is in cell phones and other wireless devices operating, for example, in the area of 1.9 GHZ. Direct modulation architecture is of interest because of its simplicity and lower number of external circuit components such as surface acoustic wave (SAW) filters and voltage control oscillators (VCOs). Also, since there are no intermediate frequency stages, the stages need not be driven. Consequently, the direct modulation transmitter provides for decreased power requirements. Efforts at integrating as many components as possible of a direct conversion transceiver onto a single chip have further led to increased popularity.

Since the number of intermediate frequency stages and components are minimized, direct modulation architecture has inherently provided difficulty in providing maximum isolation between the modulator output and an antenna. There is only one RF stage. It is highly desirable to provide for maximum gain control in the RF domain. Due to the close coupling of the load and modulator, pulling and injection lock of the local oscillator may be common occurrences.

One prior art approach to address these problems is by modulating on a sub-harmonic of the RF carrier frequency and performing signal control on the sub-harmonic frequency. Then, the sub-harmonic frequency is multiplied, and the signal control is also performed on signals at the desired frequency. This approach increases dynamic range.

However, this approach will cause large modulation distortions for non-constant signal envelope digital modulation and other systems using complex modulation. These forms of modulation include quadrature phase shift keying (QPSK) and some other forms of phase shift keying. Relevant cell phone technologies include CDMA (code division multiplex access), WCDMA (wideband CDMA), and WCDMA-2000 GSM (Global System for Multiple Communications) and EDGE (Enhanced Data Rates for GSM Evolution).

SUMMARY OF THE INVENTION

It is therefore a general object of the present invention to provide a direct modulation transmitter having high dynamic range and low distortion.

It is a further object of the present invention to provide, in a direct modulation transmitter, signal processing at a first frequency level for a signal to be transmitted and increasing frequency to transmission frequency in a manner to avoid distortion.

It is the further specific object of the present invention to provide a direct modulation transmitter utilizing a squaring function in up-converting basic processing signal.

Briefly stated, in accordance with the present invention, there are provided an apparatus and method in which phase and quadrature (I&Q respectively) signals provided for modulation on a signal to be transmitted, generally with a suppressed carrier. A square root operation is performed on signals prior to modulation. Signal processing is performed. Then the I&Q modulated complex signal is squared to increase its frequency with minimized distortion. Since the desired signal is increased, carrier rejection is also increased.

BRIEF DESCRIPTION OF THE DRAWINGS

The means by which the foregoing objects and features of invention are achieved are pointed with particularity in the claims forming the concluding portion of the specification. The invention, both as to its organization and manner of operation, may be further understood in reference to the following description taken in connection with the following drawings.

Of the drawings.

DETAILED DESCRIPTION OF THE INVENTION

Figure 1:
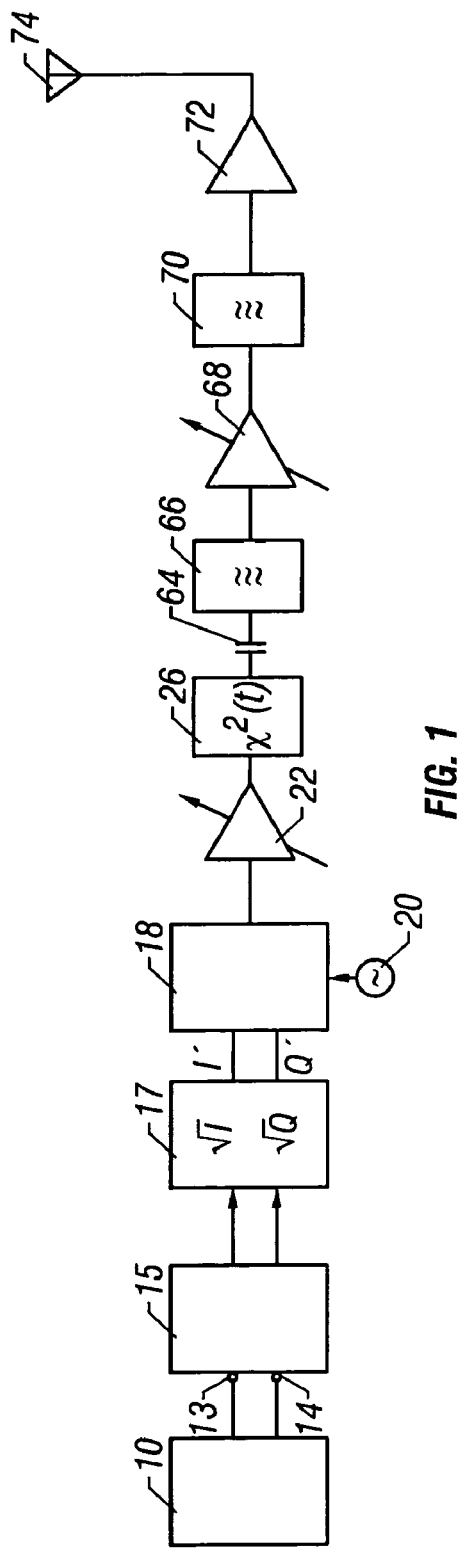
FIG. 1 is a block diagram of the modulation scheme of the present invention.

FIG. 1 is a block diagram illustrating a direct conversion transmitter constructed in accordance with the present invention. A signal source 10 provides I&Q inputs to input terminals 13 and 14 of a digital signal processor 15. Signal source 10 may be a well known source providing data, voice information or both. The I&Q signals provided to the terminals 13 and 14, respectively, are generated in baseband processing with the processor 15 performing a square root operation on the I&Q signals.

In the preferred form, I&Q signals are digital. Signal processing is done in a digital signal processor 15. A square root is taken of the baseband signal by a square root circuit 17. The square root circuit is illustrated as separate from the digital signal processor 15 solely for purposes of demonstrating that the square root circuit may be analog or digital. In the digital embodiment, the block 17 is in fact comprised in the digital signal processor 15 and is run by the software for the digital signal processor 15. Provision of hardware blocks for analog processing entail extra expense, even if the square root processor is on an integrated circuit.

The initial square root processing can be seen as a specific signal pre-distortion. This is a pre-distortion method in which large modulation distortion is inherently avoided. A common dynamic range of gain required in the transmitter is 80 dB. As is further described below, the square root operation is performed on the I&Q signals prior to modulation. After modulation, the I&Q signals will be subjected to a "raised to the second power" operation. This squared output will be a linear function of input I&Q signals. In a conventional converter, the I&Q modulated signal has a gain control range of 35 dB and the radio frequency signal has a gain control of 35 dB, and the total gain control range will be 70 dB. However, here, the radio frequency signal will be squared. Therefore, the gain control range in the radio frequency domain will be 70 dB rather than 35 dB. This will provide for a total gain control of 35 dB plus 70 dB, or 105 dB.

Figure 2:
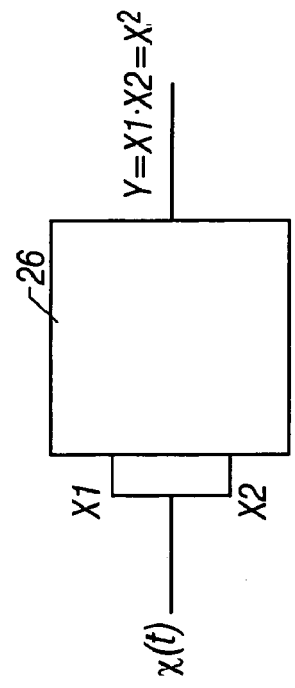
FIG. 2 is a block diagram of a direct conversion transmitter constructed in accordance with the present invention.

The square root of I and square root of Q outlets are fed to a conventional Gilbert cell modulator 18. Local oscillator 20 of the modulator 18 has a frequency of half of the desired transmitter frequency. A variable gain amplifier 22 at the output of the modulator 18 is also processing a signal at half of the desired transmitter frequency. The variable gain amplifier 22 provides an adjustable signal level, i.e., a signal of pre-selected power. The output of the variable gain amplifier 22 is provided to a squaring circuit 26, further illustrated in FIG. 2. As seen in FIG. 2, the squaring circuit 26 is a Gilbert multiplier. The output of the variable gain amplifier is x(t). The input is divided into first and second inputs x1 and x2 of the squaring circuit 26. The squaring circuit 26 provides an output of the form $y=x1 \cdot x2=x^2$.

The result of the squaring operation is a signal on the output of squaring circuit 26 which is the square of the input signal. The squaring operation also provides a DC component which is eliminated by a DC blocking capacitor 64 at the output of the squaring circuit 60. The output of the form $w=x^2$ has a frequency which is double the frequency of x and which is the desired transmission signal frequency.

The control range of the signal output level is proportional to the square of the control range in the variable gain amplifier 22. The square of the first signal is double the value of the first signal expressed in dB. After filtering in filter 66, a second variable gain amplifier 68 amplifies the radio frequency output from the squaring circuit 26. Conventional filtering means 70 are connected between the output of the variable gain amplifier 68 and a power amplifier 72. The output of the power amplifier 72 is provided for transmission by an antenna 74. In the present illustration, the antenna 74 is also intended to include impedance matching circuits.

An example of the operation of the present invention is provided in Table 1.

TABLE 1

|  |  | Min | Max |
| --- | --- | --- | --- |
| IQ Inputs signal | mVpp | 500 | 500 |
| IQ Squared signal | mVpp | 500 | 500 |
| IQ Modulator output | dBm | −20 | −20 |
| 1-st VGA | dBm | −35 | −10 |
| Signal Squaring | dBm | −60 | −10 |
| 2-nd VGA | dBm | −69 | 5 |
| PA | dBm | −47 | 27 |
| Antenna | dBm | −50 | 24 |

Distortions due to feedback inherent in circuitry of the modulator 18 are considerably lower because the IQ modulator 18 does not work on the same frequency as the transmitted frequency. Additionally, local oscillator pulling and/or inject locking is also significantly improved because the local oscillator does not work on the same frequency as the output signal from the transmitter. High control range of the output is provided while distortion is avoided.

What is thus provided is an efficient, low distortion direct modulator system and improved direct modulation transmitter. The teachings above will enable those skilled in the art to make many forms of the present invention not specifically recited above in accordance with the present invention.

What is claimed is:

1. A direct conversion transmitter comprising:
   signal means providing an input signal at a baseband frequency;
      a square root circuit receiving the input signal and providing a modulation input signal for a modulator at a square root of the input signal at the baseband frequency;
      the modulator modulating the output of the square root circuit, the modulator operating on a modulation frequency of one half RF, where RF is a transmission frequency of the direct conversion transmitter, to convert the input signal to one half RF;
      a variable gain amplifier coupled to the output of the modulator,
      a squaring circuit coupled to an output of the variable gain amplifier and squaring the modulated signal to convert the output of the variable gain amplifier to the transmission frequency; and
      gain control means for providing dynamic range in the transmission frequency, the gain control means providing an output for coupling to a transmission antenna.

2. The transmitter according to claim 1 wherein the signal means provides an in-phase signal and quadrature signal for modulation and wherein the modulator comprises a Gilbert cell modulator.

3. The transmitter of claim 2 wherein the circuit is comprised in a digital signal processor receiving the input signals.

4. The transmitter of claim 2 wherein the square root circuit comprises an analog circuit.

5. The transmitter of claim 3 wherein the squaring circuit comprises a Gilbert multiplier.

6. A direct conversion transmitter comprising:
   signal means providing an input signal at a baseband frequency;
      a square root circuit receiving the input signal and providing a modulation input signal for a modulator at a square root of the input signal at the baseband frequency;
      the modulator modulating the output of the square root circuit, the modulator operating on a modulation frequency of one half RF, where RF is a transmission frequency of the direct conversion transmitter, to convert the input signal to one half RF;
      a squaring circuit coupled to an output of the modulator and squaring the modulated signal to convert the output of the modulator to the transmit frequency; and
      gain control means for providing dynamic range in the transmission frequency, the gain control means providing an output for coupling to a transmission antenna.

7. The transmitter according to claim 6 wherein the signal means provides an in-phase signal and quadrature signal for modulation and wherein the modulator comprises a Gilbert cell modulator.

8. The transmitter of claim 7 wherein the square root circuit is comprised in a digital signal processor receiving the input signals.

9. The transmitter of claim 8 wherein the squaring circuit comprises a Gilbert multiplier.

10. The transmitter of claim 7 wherein the square root circuit comprises an analog circuit.

* * * * *